United States Patent
Noh

(10) Patent No.: US 6,632,571 B2
(45) Date of Patent: Oct. 14, 2003

(54) POLYMERIC GEL ELECTROLYTE AND LITHIUM BATTERY EMPLOYING THE SAME

(75) Inventor: Hyung-gon Noh, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 123 days.

(21) Appl. No.: 09/855,852

(22) Filed: May 16, 2001

(65) Prior Publication Data

US 2003/0082457 A1 May 1, 2003

(30) Foreign Application Priority Data

May 16, 2000 (KR) ........................................ 2000-26177
Jun. 22, 2000 (KR) ........................................ 2000-34505

(51) Int. Cl.[7] .............................................. H01M 6/14
(52) U.S. Cl. .................... 429/303; 429/309; 429/317; 429/322; 429/323; 429/331; 429/332; 429/338; 429/342
(58) Field of Search ................... 429/303, 309, 429/317, 322, 338, 323, 342, 331, 332

(56) References Cited

FOREIGN PATENT DOCUMENTS

| EP | 0 838 487 A1 | * | 4/1998 |
| EP | 1 041 657 A2 | * | 10/2000 |
| JP | 11-73992 | * | 3/1999 |

* cited by examiner

Primary Examiner—Laura Weiner
(74) Attorney, Agent, or Firm—Staas & Halsey LLP

(57) ABSTRACT

Provided are a polymeric gel electrolyte comprising a lithium salt, an organic solvent and a thermal curing product of a composition having a terpolymer having a repeating unit represented by formula (1), a repeating unit represented by formula (2) and a repeating unit represented by formula (3):

$$—(CH_2CH_2O)—$$ Formula 1

$$\begin{array}{c}—(CH_2CHO)—\\ |\\ CH_2\\ |\\ O(CH_2CH_2O)_nR\end{array}$$ Formula 2

$$\begin{array}{c}—(CH_2CHO)—\\ |\\ CH_2OCH_2CH{=}CH_2\end{array}$$ Formula 3 wherein n is an integer from 1 to 12, and R is a $C_1$ to $C_{12}$ alkyl group, and a lithium battery employing the polymeric electrolyte. Use of a polymeric gel electrolyte according to the present invention can effectively suppress swelling due to an electrolytic solution, and a lithium battery which can prevent reliability and safety from being lowered due to the swelling, can be attained.

48 Claims, 1 Drawing Sheet

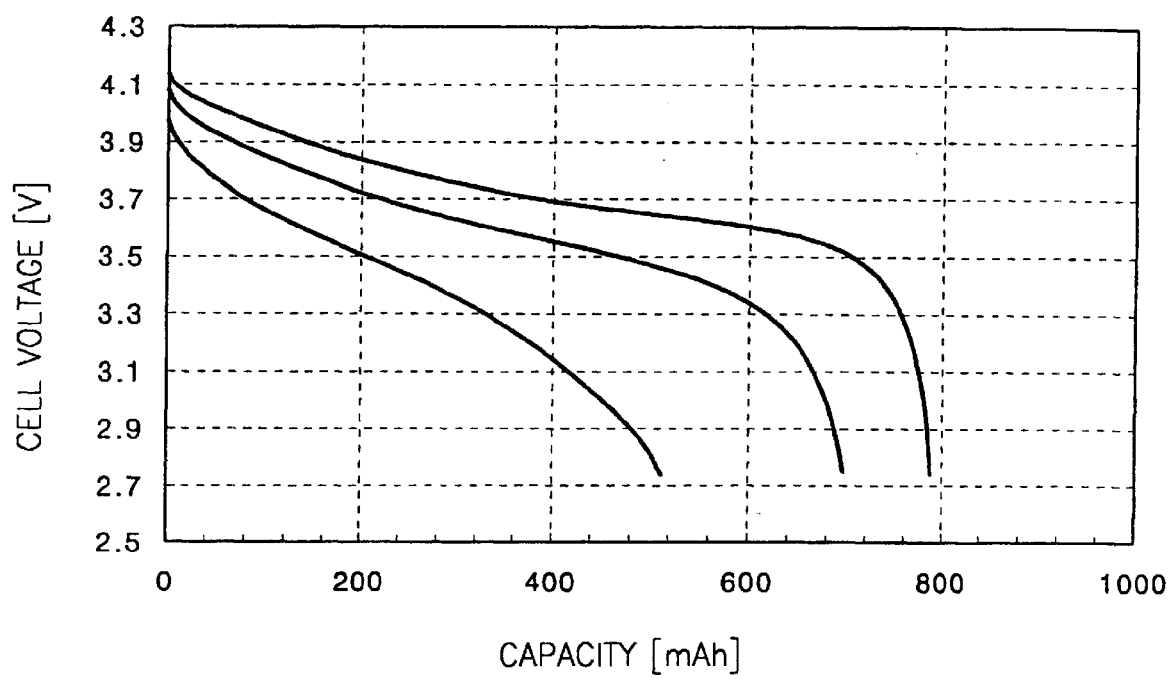

POLYMERIC GEL ELECTROLYTE AND LITHIUM BATTERY EMPLOYING THE SAME

CROSS REFERENCE TO RELATED APPLICATIONS

This application claims the benefit of Korean Patent Application Nos. 00-26177 and 00-34505, filed May 16, 2000 and Jun. 22, 2000, respectively, in the Korean Industrial Property Office, the disclosures of which are incorporated herein by reference.

BACKGROUND OF THE INVENTION

1. Field of the Invention

The present invention relates to a polymeric gel electrolyte and a lithium battery employing the same, and more particularly, to a polymeric gel electrolyte free from leakage of an electrolytic solution even at an increase in the capacity, and a lithium battery having improved safety and reliability by using the polymeric gel electrolyte.

2. Description of the Related Art

In a conventional cylindrical or prismatic lithium secondary ion battery, a polyethylene separator is generally used in consideration of short-circuit prevention and a thermal-shutdown effect as well as tolerance against tension applied when winding an electrode assembly having a cathode, an anode and a separator interposed therebetween. However, in the case of using the polyethylene separator, it is quite difficult to manufacture a high-capacity battery of over 1000 mAh, in practice, due to leakage of an electrolytic solution.

As it was known that use of an ethylene oxide homopolymer and alkali metallic ion system makes it possible to obtain excellent ion conductivity characteristics of a battery, research into solid polymer electrolyte has been intensively conducted. As a result, much attention has been paid to polyether such as polyethylene oxide as a polymer matrix, in view of its high mobility and solubility of metallic cations.

Movement of metallic ions occurs at an amorphous area rather than at a crystallized area of polymer. Thus, in order to reduce the crystallinity of polyethylene oxide, the polyethylene oxide may be copolymerized with various kinds of epoxides, as proposed in U.S. Pat. Nos. 5,968,681 and 5,837,157.

In order to solve a serious problem of leakage of an electrolytic solution during manufacture of a high-capacity battery having a winding-type electrode assembly, the present inventors completed a battery according to the present invention to overcome the disadvantages of a polyethylene separator, by using a separator formed of a crosslinked structure of polyethylene oxide, together with the polyethylene separator.

SUMMARY OF THE INVENTION

To solve the above problems, it is a first object of the present invention to provide a polymeric electrolyte which can prevent leakage of an electrolytic solution due to an increase in battery capacity.

It is a second object of the present invention to provide a lithium battery having improved reliability and safety by using the electrolyte.

To achieve the first object, there is provided a polymeric gel electrolyte comprising a lithium salt, an organic solvent and a curing product of a composition having a terpolymer having a repeating unit represented by formula (1), a repeating unit represented by formula (2) and a repeating unit represented by formula (3):

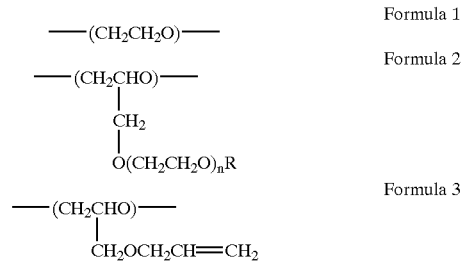

wherein n is an integer from 1 to 12, and R is a $C_1$ to $C_{12}$ alkyl group.

A plasticizer is further added to the composition.

According to another aspect of the present invention, there is provided a polymeric gel electrolyte comprising a lithium salt, an organic solvent and a polymerizing product of a crosslinking agent and a terpolymer having a repeating unit represented by formula (1), a repeating unit represented by formula (2) and a repeating unit represented by formula (3):

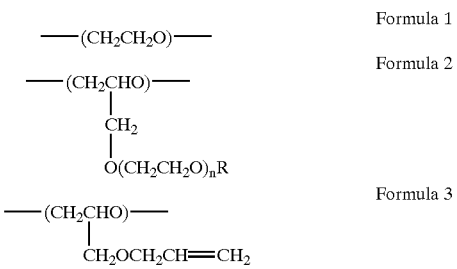

wherein n is an integer from 1 to 12, and R is a $C_1$ to $C_{12}$ alkyl group.

N,N-(1,4-phenylene) bismaleimide is preferably used as the crosslinking agent and the content thereof is 0.1 to 50 parts by weight based on 100 parts by weight of the terpolymer.

A catalyst is further included in the polymerization reaction between the terpolymer and the crosslinking agent. Preferred examples of the catalyst include benzoylperoxide, azobis(isobutyronitrile) (AIBN) and dicumylperoxide, and the content of the catalyst is 0.1 to 20 parts by weight based on 100 parts by weight of the terpolymer.

To achieve the second object, there is provided a lithium battery including an electrode assembly having a cathode, an anode and a separator interposed therebetween, a polymeric gel electrolyte comprising a lithium salt, an organic solvent and a curing product of a composition having a terpolymer having a repeating unit represented by formula (1), a repeating unit represented by formula (2) and a repeating unit represented by formula (3):

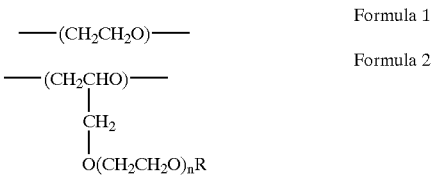

-continued

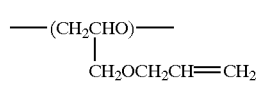
$$\begin{array}{c}-(CH_2CHO)-\\|\\CH_2OCH_2CH=CH_2\end{array}$$ Formula 3 wherein n is an integer from 1 to 12, and R is a $C_1$ to $C_{12}$ alkyl group, and a case accommodating the electrode assembly and the polymeric electrolyte.

Alternatively, the present invention provides a lithium battery including an electrode assembly having a cathode, an anode and a separator interposed therebetween, a polymeric gel electrolyte comprising a lithium salt, an organic solvent and a polymerizing product of a crosslinking agent and a terpolymer having a repeating unit represented by formula (1), a repeating unit represented by formula (2) and a repeating unit represented by formula (3):

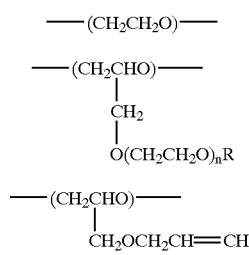
$$-(CH_2CH_2O)-$$ Formula 1
$$\begin{array}{c}-(CH_2CHO)-\\|\\CH_2\\|\\O(CH_2CH_2O)_nR\end{array}$$ Formula 2
$$\begin{array}{c}-(CH_2CHO)-\\|\\CH_2OCH_2CH=CH_2\end{array}$$ Formula 3 wherein n is an integer from 1 to 12, and R is a $C_1$ to $C_{12}$ alkyl group, and a case accommodating the electrode assembly and the polymeric electrolyte.

The polymeric electrolyte is preferably prepared by mixing the terpolymer having the repeating unit represented by formula (1), the repeating unit represented by formula (2), and the repeating unit represented by formula (3) with a lithium salt, an organic solvent, a catalyst and a crosslinking agent, injecting the resultant into a case accommodating the electrode assembly, and polymerizing. Alternatively, the polymeric electrolyte may be prepared by coating a composition obtained by mixing the terpolymer having the repeating unit represented by formula (1), the repeating unit represented by formula (2), and the repeating unit represented by formula (3) with a lithium salt, an organic solvent, a catalyst and a crosslinking agent, on at least one of a cathode, an anode and a separator, drying the resultant and polymerizing.

BRIEF DESCRIPTION OF THE DRAWING

FIG. 1 is a graph showing the charge/discharge characteristics by rate of a lithium battery according to Example 1 of the present invention.

DESCRIPTION OF THE PREFERRED EMBODIMENT

Reference will now be made in detail to the embodiments of the present invention, examples of which are illustrated in the accompanying drawings, wherein like reference numerals refer to the like elements throughout. The embodiments are described below in order to explain the present invention by referring to the FIGURES.

The feature of the present invention lies in that an insulating resin sheet having a network structure is interposed between a cathode and an anode as a separator, together with a polymeric electrolyte containing a lithium salt, an organic solvent and a curing product of a composition having a terpolymer comprising a repeating unit represented by formula (1), a repeating unit represented by formula (2), and a repeating unit represented by formula (3):

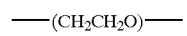
$$-(CH_2CH_2O)-$$ Formula 1
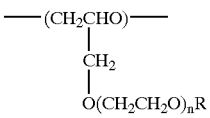
$$\begin{array}{c}-(CH_2CHO)-\\|\\CH_2\\|\\O(CH_2CH_2O)_nR\end{array}$$ Formula 2
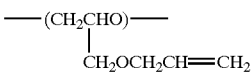
$$\begin{array}{c}-(CH_2CHO)-\\|\\CH_2OCH_2CH=CH_2\end{array}$$ Formula 3 wherein n is an integer from 1 to 12, and R is a $C_1$ to $C_{12}$ alkyl group. Here, a plasticizer is further added to the composition, thereby obtaining a polymeric gel electrolyte.

In Formula (2), specific examples of R include a methyl group, an ethyl group and the like.

In the terpolymer, the content of the repeating unit represented by formula (1) may be 0.1 to 0.9 mol, the content of the repeating unit represented by formula (2) may be 0.1 to 0.8 mol, and the content of the repeating unit represented by formula (3) may be 0.01 to 0.8 mol. The weight-average molecular weight of the terpolymer is preferably $10^3$ to $10^7$, and more preferably $5 \times 10^5$ to $1.2 \times 10^6$. The glass transition temperature of the terpolymer is preferably −80 to 100° C. Here, the contents of the repeating units represented by formula (1), (2) and (3), the weight-average molecular weight of the terpolymer and the glass transition temperature of the terpolymer are outside the above-described ranges, the physical properties of the polymer electrolyte are undesirably deteriorated.

In the polymeric electrolyte, the weight of the terpolymer and the total weight of the lithium salt and organic solvent are preferably within the range from about 1:1 to 1:50, more preferably 1:12.5 to 1:40. If the content of the terpolymer relative to the lithium salt and organic solvent exceeds the range, the ionic conductivity of the polymer electrolyte may be lowered. If the content of the terpolymer relative to the lithium salt and organic solvent falls short of the range, the physical property of the polymeric electrolyte may be unfavorably deteriorated.

Polyethylene separator, polypropylene separator, or a combination thereof is used as the insulating resin sheet having the network structure. The thickness of the separator is preferably 5 to 20 μm and the thickness of the polymer electrolyte is preferably 2 to 50 μm. If the thicknesses of the polyethylene separator and the first separator are greater than the respective upper limits, the battery becomes bulky. If the thicknesses of the separator and the polymer electrolyte are less than the respective lower limits, the effects of improving the reliability and safety, which are attained by stacking the polymer electrolyte on the separator, are unfavorably negligible.

The plasticizer is a carbonate-based material among organic solvents contained in an electrolytic solution and examples thereof include propylene carbonate (PC), ethylene carbonate (EC), dimethyl carbonate (DMC), methylethyl carbonate (MEC), diethyl carbonate (DEC) and mixtures thereof. The content of the plasticizer is preferably 10 to 60 parts by weight, based on 100 parts by weight of the total amount of the terpolymer. If the content of the plasticizer is less than 10 parts by weight, it is difficult to form pores. If the content of the plasticizer is greater than 60 parts by weight, the physical properties of a film may be undesirably deteriorated.

Also, the present invention provides a polymeric gel electrolyte comprising a lithium salt, an organic solvent and a polymerizing product of a crosslinking agent and a terpolymer having a repeating unit represented by formula (1), a repeating unit represented by formula (2), and a repeating unit represented by formula (3). Here, N,N-(1,4-phenylene) bismaleimide is used as the crosslinking agent, and the content thereof is preferably 0.1 to 50 parts by weight based on 100 parts by weight of the terpolymer. If the content of the crosslinking agent exceeds this range, the reactivity between the terpolymer and the crosslinking agent may become unfavorably deteriorated.

A catalyst is added for the polymerization between the terpolymer and the crosslinking agent. As the catalyst, at least one selected from the group consisting of benzoylperoxide, azobis (isobutyronitrile) (AIBN) and dicumylperoxide is used. The content of the catalyst is generally an acceptable level, preferably 0.1 to 20 parts by weight based on 100 parts by weight of the terpolymer. If the content of the catalyst falls short of the range, the effect exhibited by adding the catalyst is negligible. If the content of the catalyst exceeds the range, the physical property of the resulting polymeric electrolyte may be unfavorably deteriorated.

In the terpolymer, the content of the repeating unit represented by formula (1) may be 0.1 to 0.9 mol, the content of the repeating unit represented by formula (2) may be 0.1 to 0.8 mol, and the content of the repeating unit represented by formula (3) may be 0.01 to 0.8 mol. Also, the weight-average molecular weight of the terpolymer is preferably within the range from about 103 to 107, more preferably 5×105 to 1.2×106. If the weight-average molecular weight of the terpolymer may be out of this range, the terpolymer is unfavorably difficult to dissolve. The glass transition temperature of the terpolymer is preferably within the range from about −80 to 100° C.

In particular, the lithium battery, having a wound type electrode assembly and a pouch type case incorporating the electrode assembly, is preferred. If the pouch is used as a case, the energy density per weight and energy density per volume increase and thin, lightweight batteries can be attained, and the material cost for the case can be reduced.

The above-described gel electrolyte can be prepared by the following methods.

First, a terpolymer having a repeating unit represented by formula (1), a repeating unit represented by formula (2), and a repeating unit represented by formula (3) is mixed with a lithium salt and an organic solvent, a catalyst and a crosslinking agent are added thereto, and then the resultant structure is injected into a case accommodating an electrode assembly and polymerized, which will now be described in more detail.

According to this method, a terpolymer having a repeating unit represented by formula (1), a repeating unit represented by formula (2) and a repeating unit represented by formula (3) is mixed with an electrolytic solution containing a lithium salt and an organic solvent. Here, the mixture ratio of the weight of the terpolymer to the weight of the electrolytic solution are preferably within the range from about 1:1 to 1:50, more preferably 1:12.5 to 1:40. If the content of the terpolymer relative to the electrolytic solution exceeds the range, the viscosity of the electrolyte forming composition may become high, which results in difficulty of injecting the composition into the battery case. If the content of the terpolymer relative to the electrolytic solution falls short of the range, the polymerizing reactivity may be unfavorably lowered.

Then, a catalyst and a crosslinking agent are added to the thus formed mixture, thereby obtaining the electrolyte forming composition. Here, as the catalyst, benzoylperoxide, azobis(isobutyronitrile) (AIBN) or dicumylperoxide is used. As the crosslinking agent, N,N-(1,4-phenylene) bismaleimide or the like is used. Here, when the crosslinking agent is added to the mixture, the tensile strength of the polymeric gel electrolyte becomes advantageously strong.

In some cases, the mixture obtained in the above process may be mixed in a sealed glove box for over 12 hours. If the mixing step is performed, the composition of the mixture can be advantageously homogenized.

Thereafter, the electrolyte forming composition is injected into a case accommodating an electrode assembly and then polymerized within the range from about 50 to 200° C., thereby obtaining a gel electrolyte.

When the polymerization temperature in the battery is lower than 50° C., the polymerization reactivity may be lowered. When the polymerization temperature in the battery is higher than 200° C., the organic solvent constituting the electrolytic solution may be unfavorably evaporated.

The second method for preparing the gel electrolyte includes coating a composition obtained by mixing a terpolymer having a repeating unit represented by formula (1), a repeating unit represented by formula (2), and a repeating unit represented by formula (3), with a lithium salt, an organic solvent, a catalyst and a crosslinking agent, on at least one of a cathode, an anode and a separator, drying and then polymerizing. Here, the polymerization conditions are the same as those in the first method.

The organic solvent for the electrolytic solution of the present invention is at least one carbonate-based solvent selected from the group consisting of propylene carbonate (PC), ethylene carbonate (EC), dimethylcarbonate (DMC), methylethylcarbonate (MEC), diethylcarbonate (DEC) and vinylene carbonate (VC). In particular, in the case of adding VC as the organic solvent for the electrolytic solution, the performance, particularly, the lifetime performance of a battery is improved. As the lithium salt, at least one ionic lithium salt may be selected from the group consisting of $LiClO_4$, $LiBF_4$, $LiPF_6$, $LiCF_3SO_3$, $LiN(CF_3SO_2)_2$.

A method of manufacturing a lithium battery according to an embodiment of the present invention will now be described.

First, an electrode active material layer is formed on a current collector using an electrode active material composition comprising an electrode active material, a binder, a conductive agent and a solvent. Here, the electrode active material layer may be formed such that the electrode active material composition is directly coated on the current collector, or on a separate support body and dried. In the latter case, a film is then peeled off from the support body and laminated on the current collector. Here, as the support body, any material that can support the active material layer may be used, and detailed examples thereof include a mylar film and a polyethylene terephthalate (PET) film.

In the present invention, a lithium composite oxide, such as $LiCoO_2$, may be used as the electrode active material for a cathode, and carbon or graphite may be used as the electrode active material for an anode. As the conductive agent, carbon black or the like can be used. Here, the content of the conductive agent is preferably 1 to 20 parts by weight based on 100 parts by weight of the electrode active material, e.g., $LiCoO_2$. When the content of the conductive agent is smaller than 1 part by weight, the conductivity improving effect of the electrode active material layer and the current collector may be negligible. When the content of the conductive agent is greater than 20 parts by weight, the content of the electrode active material may be relatively reduced.

As the binder, vinylidenefluoride-hexafluoropropylene (VdF/HFP) copolymer, polyvinylidenefluoride, polyacrylonitrile, polymethylmethacrylate and mixtures thereof may be used, and the content thereof is preferably about 5 to 30 parts by weight based on 100 parts by weight of the electrode active material. When the content of the binder is within this range, the adhesion between the current collector and the electrode active material layer is excellent.

All solvents for use in the conventional lithium secondary battery can be used as the solvent, and detailed examples thereof include acetone and N-methylpyrrolidone.

In some cases, in order to improve the performance of a battery, specifically the high rate performance of a battery, $Li_2CO_3$ may be further added to the electrode active material composition.

The cathode and the anode are prepared in the above-described manners, respectively, and then a composition for forming a polymeric electrolyte is coated on the anode or cathode. The following provides one example of how the polymeric electrolyte forming composition is prepared.

A terpolymer comprising a repeating unit represented by formula (1), a repeating unit represented by formula (2), and a repeating unit represented by formula (3) and a solvent are mixed. Here, a plasticizer may be further added to the mixture. In the mixing step, the mixture is preferably stirred at about 10 to 40° C. This is for causing the composition having a viscosity to be uniformly dispersed. Here, any solvent that is capable of dissolving the terpolymer can be used as the solvent, and specific examples thereof include acetone, acetonitrile and the like. Also, a carbonate-based material is used as the plasticizer, as described above. A catalyst for facilitating a curing of the terpolymer may be further added to the composition for forming a polymeric gel electrolyte. In the case of adding the catalyst, the temperature of a subsequent heat treatment process can be advantageously lowered. Specific examples of the catalyst include benzoyl peroxide (BPO), azobis(isobutyronitrile) and the like.

Then, the result is put into an oven and thermally treated at a temperature in the range of about 50 to 200° C. to form the polymeric electrolyte on either electrode plate. Although other temperatures are possible, if the thermal treatment temperature is lower than 50° C., the curing reaction of the terpolymer does not occur properly. If the thermal treatment temperature is higher than 200° C., the binder in the electrode plate may be undesirably melted.

If the thermal treatment is performed in the above-described manner, the curing of the terpolymer occurs at the double bond contained in the repeating unit represented by formula (3).

Then, an insulating resin sheet having a network structure is stacked on the polymeric electrolyte of the electrode and the other electrode plate is stacked thereon and then assembled, thereby completing the lithium battery. The insulating resin sheet having a network structure is made of polyethylene, polypropylene and a combination thereof.

A method of manufacturing a lithium battery according to another embodiment of the present invention will now be described.

A cathode plate and an anode plate are fabricated in the same manner as in the first embodiment, a separator is interposed between the cathode and anode plates, and then wound by a jelly-roll method to form an electrode assembly or a bi-cell electrode assembly. Here, the separator of the present invention is not specifically limited, and a separator having a network structure so as to impregnate the electrolyte forming composition, is preferred. Detailed examples of materials for such a separator include polyethylene, polypropylene, and a combination thereof.

Subsequently, the electrode assembly is put into the case. Thereafter, the terpolymer having a repeating unit represented by formula (1), a repeating unit represented by formula (2), and a repeating unit represented by formula (3) is dissolved in an electrolytic solution containing an organic solvent and a lithium salt, and then a crosslinking agent and a catalyst are added thereto, thereby obtaining an electrolyte forming composition.

Thereafter, the electrolyte forming composition is injected into the battery case, and then polymerized. Here, the polymerization temperature is maintained within the range from about 50 to 200° C., as described above.

As the result of the polymerization reaction, the electrolyte forming composition present within the electrode assembly is gelled. As described above, if the electrolyte exists in a gel state, the electrolyte is unlikely to be leaked outside, thereby preventing the safety and reliability from lowering due to leakage of the electrolytic solution.

In addition, the gel electrolyte can be prepared in the following manner.

That is to say, a composition containing a lithium salt, an organic solvent, a crosslinking agent, a catalyst and a terpolymer having a repeating unit represented by formula (1), a repeating unit represented by formula (2), and a repeating unit represented by formula (3) is coated on at least one of a cathode, an anode and a separator, and then polymerized, thereby obtaining the gel electrolyte.

The lithium battery according to the present invention is not specifically restricted in its shape, and generally refers to both a lithium primary battery and a lithium secondary battery such as a lithium ion battery or a lithium polymer battery.

The present invention will now be described in more detail with reference to the following examples, but is not limited thereto.

EXAMPLE 1

15 g of polyvinylidenfluoride was added to 600 ml of acetone and mixed with a ball mill for about 2 hours to be dissolved. To the mixture were added 470 g of $LiCoO_2$ and 15 g of SUPER-P™ brand carbon black (sold by 3M Carbon Company) and then mixed for about 5 hours to form a cathode active material composition.

The cathode active material composition was coated on an aluminum foil having a thickness of 147 $\mu$m and a width of 4.9 cm using a doctor blade having a gap of 320 $\mu$m and dried to form a unit cathode plate.

Next, an anode plate is fabricated as follows.

50 g of polyvinylidenefluoride was added to 600 ml of acetone and mixed with a ball mill for about 2 hours to be dissolved. To the mixture were added 449 g of mezocarbon fiber (MCF) and 1 g of oxalic acid for increasing the adhesion to a copper foil, and then mixed for about 5 hours to form an anode active material composition.

The anode active material composition was coated on a copper film having a thickness of 178 $\mu$m and a width of 5.1 cm using a doctor blade having a gap of 320 $\mu$m and dried to form a unit anode plate.

5 g of a terpolymer comprising a repeating unit represented by formula (1) (ethylene oxide), a repeating unit represented by formula (2), wherein n=2 and R is a methyl group, and a repeating unit represented by formula (3) (allyl glycidyl ether), manufactured by Daiso Co., Ltd., Osaka, Japan, the weight-average molecular weight of the terpolymer being 1×106, and the molar ratio of the repeating unit represented by formula (1) to the repeating unit represented by formula (2) to the repeating unit represented by formula (3) being 80:18:2, and the glass transition temperature of the terpolymer being −70° C., and 0.5 g of BPO were dissolved in 200 ml of acetonitrile, and the resultant solution was mixed with 2 g of propylene carbonate to form a composition for forming an electrolyte to then be coated on the anode plate using a doctor blade. Thereafter, the resultant structure was put into an oven maintained at a temperature of 100° C. and cured for about 4 hours to form a separator. Here, the thickness of the separate was 10 μm.

On the formed separator was stacked a polyethylene separator, manufactured by Asahi Chemical Industry Co., Ltd., having a width of 5.35 cm and a thickness of 18 μm. Then, the cathode was stacked on the resultant structure. Subsequently, the resultant structure was wound and put into a pouch. Then, an electrolytic solution manufactured by Ube Industries, Ltd., that is, 1.5M $LiPF_6$ dissolved in a mixture solvent of EC, DMC and DEC in the ratio by volume of 3:3:4, was injected into the battery case, thereby completing the lithium secondary battery.

EXAMPLE 2

15 g of polyvinylidenefluoride was added to 600 ml of acetone and mixed using a ball mill for about 2 hours to be dissolved. 470 g of $LiCoO_2$ and 15 g of SUPER-P™ brand carbon black (sold by 3M Carbon Company) were added to the resulting mixture and then mixed for about 5 hours to form a cathode active material composition.

The cathode active material composition was coated on an aluminum foil having a thickness of 147 μm and a width of 4.9 cm using a doctor blade having a gap of 320 μm and dried to form a cathode plate.

Then, an anode plate was manufactured as follows.

50 g of polyvinylidenefluoride was added to 600 ml of acetone and mixed using a ball mill for about 2 hours to be dissolved. 449 g of mezocarbon fiber (MCF) and 1 g of oxalic acid for enhancing the adhesion between a current collector and an active material layer for an anode were added to the mixture and then mixed for about 5 hours to form an anode active material composition.

The anode active material composition was coated on a copper foil having a thickness of 178 μm and a width of 5.1 cm using a doctor blade having a gap of 420 μm, and then dried to form an anode plate.

Separately from the above, a polyethylene separator (Asahi) was used as a separator. Here, the width of the separator was 5.35 cm and the thickness thereof was 18 μm.

The polyethylene separator was interposed between the cathode and anode plates, and wound by a jelly-roll method to form an electrode assembly. The electrode assembly was put into a pouch.

3 g of a terpolymer (Daiso Co., Ltd.) containing a repeating unit represented by formula (1) (ethylene oxide), a repeating unit represented by formula (2) (n is 2 and R is a methyl group), and a repeating unit represented by formula (3) (allyl glycidyl ether), the terpolymer having a weight-average molecular weight of 1×106, a repeating unit represented by formula (1): repeating unit represented by formula (2): repeating unit represented by formula (3) molar ratio of 80:18:2, and a glass transition temperature of −70° C., was added to 97 g of a mixed solution containing 1M $LiPF_6$ and EC/DEC in a mixture ratio by volume of 3:7 to be dissolved. 0.3 g of N,N-(1,4-phenylene)bismaleimide and 0.06 g of AIBN were added to the mixture. The obtained mixture was injected into the pouch battery, and then polymerized at about 80° C. for approximately 1 hour to prepare a gel electrolyte. Then, the resultant was hermetically sealed, thereby completing a lithium secondary battery.

EXAMPLE 3

A lithium secondary battery was completed in the same manner as Example 2, except that benzoylperoxide was used instead of AIBN and polymerization in the battery was carried out at about 80° C. for approximately 3 hours

EXAMPLE 4

A lithium secondary battery was completed in the same manner as Example 2, except that dicumylperoxide was used instead of AIBN and polymerization in the battery was carried out at about 170° C. for approximately 10 minutes.

EXAMPLE 5

A lithium secondary battery was completed in the same manner as Example 2, except that a mixed solution containing 1M $LiPF_6$ and EC/DEC/VC in a mixture ratio by volume of 3:6:1 was used, instead of the mixed solution containing 1M $LiPF_6$ and EC/DEC in a mixture ratio by volume of 3:7.

EXAMPLE 6

0.6 g (3 parts by weight based on 100 parts by weight of electrolytic solution) of a terpolymer (Daiso Co., Ltd.) containing a repeating unit represented by formula (1) (ethylene oxide), a repeating unit represented by formula (2) (n is 2 and R is a methyl group), and a repeating unit represented by formula (3) (allyl glycidyl ether), the terpolymer having a weight-average molecular weight of 1×106, a repeating unit represented by formula (1): repeating unit represented by formula (2): repeating unit represented by formula (3) molar ratio of 80:18:2, and a glass transition temperature of about −70° C. was added to 19.4 g of a mixed solution containing 1.15M $LiPF_6$ and EC/PC/DEC in a mixture ratio by volume of 41:10:49, to be dissolved. 0.06 g of N,N-(1,4-phenylene) bismaleimide and 0.08 g of AIBN were added to the mixture and then mixed in a glove box for 12 hours. 5 g of the obtained mixture was injected into the pouch battery, and then polymerized at about 80° C. for approximately 80 minutes, to prepare a crosslinked gel electrolyte. Then, the resultant was hermetically sealed, thereby completing a lithium secondary battery.

EXAMPLE 7

A lithium secondary battery was completed in the same manner as Example 6, except that a mixed solution containing 1M $LiPF_6$ and EC/PC/DEC/VC in a mixture ratio by volume of 2:2:3:2 was used, instead of a mixed solution containing 1M $LiPF_6$ and EC/PC/DEC in a mixture ratio by volume of 41:10:49.

EXAMPLE 8

0.6 g (3 parts by weight based on 100 parts by weight of electrolytic solution) of a terpolymer (Daiso Co., Ltd.) containing a repeating unit represented by formula (1) (ethylene oxide), a repeating unit represented by formula (2) (n is 2 and R is a methyl group), and a repeating unit represented by formula (3) (allyl glycidyl ether), the terpolymer having a weight-average molecular weight of 1×106, a repeating unit represented by formula (1): repeating unit represented by formula (2): repeating unit represented by formula (3) molar ratio of 80:18:2, and a glass transition temperature of about −70° C., was added to 19.4 g of a mixed solution containing 1.15M LiPF$_6$ and EC/PC/DEC in a mixture ratio by volume of 41:10:49, to be dissolved. 0.06 g of N,N-(1,4-phenylene)bismaleimide and 0.08 g of AIBN were added to the mixture and then mixed in a glove box for about 12 hours. 5 g of the obtained mixture was coated on the cathode and anode plates prepared in Example 2.

Subsequently, a polyethylene separator was interposed between the cathode plate and the anode plate and then laminated to form an electrode assembly. The electrode assembly was put into a pouch, and then polymerized at about 80° C. for approximately 80 minutes to prepare a crosslinked gel electrolyte. Then, the resultant was hermetically sealed, thereby completing a lithium secondary battery.

COMPARATIVE EXAMPLE 1

A lithium secondary battery was completed in the same manner as in Example 1, with the exception of only a polyethylene separator being used as the separator.

COMPARATIVE EXAMPLE 2

A 1.15M solution containing 1M LiPF$_6$ and EC/DMC/DEC (Ube Industries, Ltd.) in a mixture ratio by volume of 3:3:4 was injected into the pouch battery prepared in Example 2 as an electrolytic solution, instead of an electrolyte forming composition. Then, the resultant was hermetically sealed to complete the lithium secondary battery.

In the lithium secondary batteries prepared by Example 1 and Comparative Example 1, the discharge capacity and reliability tests were carried out. Here, the reliability was tested by examining the leakage degree of the electrolytic solution by applying a predetermined pressure to the batteries and pressing the same.

FIG. 1 is a graph showing the charge/discharge characteristics by rate of a lithium secondary battery prepared by Example 1 of the present invention. Referring thereto, it was confirmed that the lithium secondary battery prepared by Example 1 had excellent discharge capacity characteristics. That is, the evaluation results showed that the lithium secondary battery prepared by Example 1 had a high capacity, that is, 800 mAh. It was confirmed that leakage of an electrolytic solution in the lithium secondary battery prepared by Example 1 was noticeably reduced compared to that in Comparative Example 1, even if attainment of high capacity batteries is pursued.

Piercing tests of batteries prepared by Example 1 and Comparative Example 1 were carried out. Here, the piercing tests were performed such that batteries are normally charged and are allowed to be at an idle state for longer than 10 minutes and shorter than 72 minutes. In such a state, a nail was vertically driven into each of the batteries lengthwise along the central shaft to examine explosion or crushing of the battery.

The test results showed that five lithium ion batteries prepared by Example 1 did not experience crushing and explosion, while five lithium ion batteries prepared by Comparative Example 1 experienced crushing and explosion.

Also, in the lithium secondary batteries prepared in Examples 2–8 and Comparative Example 2, the battery reliability and safety were evaluated. Here, the reliability of a battery was evaluated by observing a change in the characteristic of the battery after it is allowed to stand at about 80° C. for approximately 4 days, and the safety was evaluated by performing an overcharging piercing test.

The evaluation tests showed that the reliability and safety of the lithium secondary batteries prepared in Examples 2–8 were better than those of the battery prepared by Comparative Example 2. This is because use of a gel electrolyte prevents the electrolyte from being leaked outside or prevents the electrode assembly or pouch from being swollen due to the electrolytic solution, causing the possibility of lowering the reliability and safety of a battery. In addition, it was ascertained that the lifetime performances of the batteries were excellent in the case of further adding vinylene carbonate as an organic solvent forming the electrolytic solution.

According to the present invention, if both the polymeric electrolyte prepared by curing a composition comprising a terpolymer having repeating units represented by formulas (1), (2) and (3) and a carbonate-based plasticizer, and the insulating resin sheet having a network structure such as the polyethylene separator are used together, the leakage of the electrolytic solution, caused by pursuit of attainment of high capacity battery by using the polyethylene separator solely, can be prevented. Also, use of a gel electrolyte according to the present invention can effectively suppress swelling due to an electrolytic solution, and a lithium battery, which can prevent reliability and safety from being decreased due to the swelling, can be attained.

Although the present invention has been described with reference to the preferred examples, the foregoing disclosure should be interpreted as illustrative only and it should be understood that various modifications and variations can be easily made by those skilled in the art without departing from the spirit of the invention. Accordingly, a true scope and spirit of the invention should be defined by the following claims.

What is claimed is:

1. A polymeric gel electrolyte comprising:
   a lithium salt;
   an organic solvent; and
   a cross-linked product of a terpolymer precursor having a repeating unit represented by formula 1, a repeating unit represented by formula 2 and a repeating unit represented by formula 3:

Formula 1

Formula 2

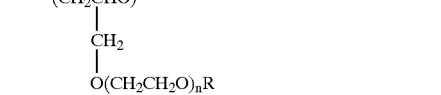

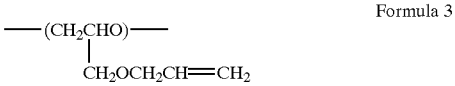
Formula 3 wherein n is an integer from 1 to 12, and R is a C$_1$ to C$_{12}$ alkyl group, and wherein:
   the lithium salt is at least one salt selected from the group consisting of lithium perchlorate (LiClO$_4$, lithium tetrafluoroborate (LiBF$_4$, lithium hexafluorophosphate (LiPF$_6$), lithium trifluoromethanesulfonate (LiCF$_3$SO$_3$) and lithium bistrifluoromethanesulfonyl amide (LiN(CF$_3$SO$_2$)$_2$), and the organic solvent is at least one solvent selected from the group consisting of propylene carbonate (PC), ethylene carbonate (EC), dimethyl carbonate (DMC), methylethyl carbonate (MEC), diethyl carbonate (DEC) and vinylene carbonate (VC).

2. A method of forming a polymeric gel electrolyte comprising:

preparing a terpolymer precursor having a repeating unit represented by formula 1, a repeating unit represented by formula 2 and a repeating unit represented by formula 3:

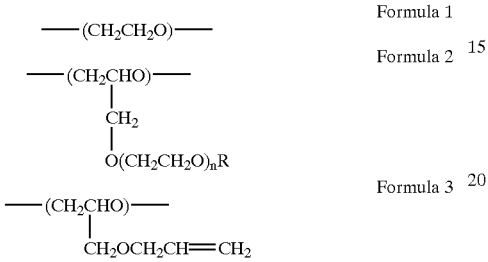

wherein n is an integer from 1 to 12, and R is a $C_1$ to $C_{12}$ alkyl group:

mixing a lithium salt and an organic solvent with the terpolymer precursor; and crosslinking the terpolymer precursor, wherein the terpolymer precursor is crosslinked via a crosslinking agent.

3. The method according to claim 2, wherein a catalyst is added before crosslinking the terpolymer via the crosslinking agent.

4. The method according to claim 2, wherein the catalyst is at least one catalyst selected from the group consisting of benzoylperoxide, azobis(isobutyronitrile) (AIBN) and dicumylperoxide, and the content of the catalyst is 0.1 to 20 parts by weight based on 100 parts by weight of the terpolymer.

5. The method according to claim 2, wherein the crosslinking agent is N,N-(1,4-phenylene) bismaleimide, and the content of the crosslinking agent is 0.1 to 50 parts by weight based on 100 parts by weight of the terpolymer.

6. The method according to claim 2 wherein the lithium salt is at least one salt selected from the group consisting of lithium perchlorate (LiClO$_4$ lithium tetrafluoroborate (LiBF$_4$), lithium hexafluorophosphate (LiPF$_6$), lithium trifluoromethanesulfonate (LiCF$_3$SO$_3$) and lithium bistrifluoromethanesulfonyl amide (LiN(CF$_3$SO$_2$)$_2$), and the organic solvent is at least one carbonate based solvent selected from the group consisting of propylene carbonate (PC), ethylene carbonate (EC), dimethyl carbonate (DMC), methylethyl carbonate (MEC), diethyl carbonate (DEC) and vinylene carbonate (VC).

7. A lithium battery comprising:

an electrode assembly having a cathode, an anode and a separator interposed therebetween;

a polymeric gel electrolyte comprising a lithium salt, an organic solvent and a curing product of a terpolymer precursor having a repeating unit represented by formula 1, a repeating unit represented by formula 2 and a repeating unit represented by formula 3:

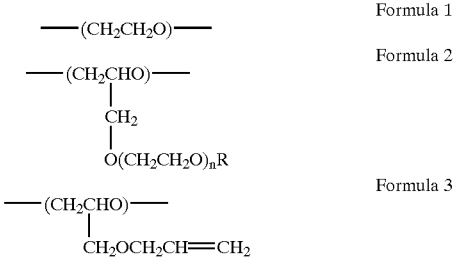

wherein n is an integer from 1 to 12, and R is a $C_1$ to $C_{12}$ alkyl group; and a case accommodating the electrode assembly and the polymeric gel electrolyte, and wherein the lithium salt is at least one salt selected from the group consisting of lithium perchlorate (LiClO$_4$), lithium tetrafluoroborate (LiBF$_4$), lithium hexafluorophosphate (LiPF$_6$), lithium trifluoromethanesulfonate (LiCF$_3$SO$_3$) and lithium bistrifluoromethanesulfonyl amide (LiN(CF$_3$SO$_2$)$_2$), and the organic solvent is at least one solvent selected from the group consisting of propylene carbonate (PC), ethylene carbonate (EC), dimethyl carbonate (DMC), methylethyl carbonate (MEC), diethyl carbonate (DEC) and vinylene carbonate (VC).

8. The lithium battery according to claim 7, wherein the terpolymer precursor contains 0.1 to 0.9 mol of the repeating unit represented by formula 1, 0.1 to 0.8 mol of the repeating unit represented by formula 2, and 0.01 to 0.8 mol of the repeating unit represented by formula 3.

9. The lithium battery according to claim 7, wherein the separator is formed of an insulating resin sheet, and the insulating resin sheet is made of at least one material selected from the group consisting of polyethylene and polypropylene.

10. The lithium battery according to claim 7, wherein the weight-average molecular weight of the terpolymer is $10^3$ to $10^7$, and the glass transition temperature is −80° C. to 100° C.

11. The lithium battery according to claim 7, wherein the ratio of the weight of the terpolymer to the total weight of the lithium salt and the organic solvent is in the range from 1:1 to 1:50.

12. The lithium battery according to claim 7, wherein the electrode assembly is a winding type electrode assembly, and the case accommodating the electrode assembly is a pouch.

13. The lithium battery according to claim 7, wherein a plasticizer is further added to the composition.

14. The lithium battery according to claim 13, wherein the plasticizer is at least one selected from the group consisting of propylene carbonate, ethylene carbonate, dimethyl carbonate, methylethyl carbonate and diethyl carbonate and the content of the plasticizer is 10 to 60 parts by weight based on 100 parts by weight of the terpolymer.

15. The lithium battery according to claim 7, wherein the curing temperature of the composition is in the range of 50 to 200° C.

16. A method of forming a lithium battery comprising:
obtaining a composition for forming en electrolyte by a process comprising:
preparing a terpolymer precursor having a repeating unit represented by formula 1, a repeating unit represented by formula 2 and a repeating unit represented by formula 3:

—(CH$_2$CH$_2$O)—      Formula 1

—(CH$_2$CHO)—
    |
   CH$_2$
    |
  O(CH$_2$CH$_2$O)$_n$R      Formula 2

—(CH$_2$CHO)—      Formula 3
    |
  CH$_2$OCH$_2$CH=CH$_2$ wherein n is an integer from 1 to 12, and R is a C$_1$ to C$_{12}$ alkyl group; and
mixing a lithium salt and an organic solvent with the terpolymer precursor,
sandwiching a separator and the composition for forming an electrolyte between a cathode and anode; and
crosslinking the terpolymer precursor, and
wherein the lithium salt is at least one salt selected from the group consisting of lithium perchlorate (LiClO$_4$, lithium tetrafluoroborate (LiBF$_4$ lithium hexafluorophosphate (LiPF$_6$), lithium trifluoromethanesulfonate (LiCF$_3$SO$_3$) and lithium bistrifluoromethanesulfonyl amide (LiN(CF$_3$SO$_2$)$_2$), and
the organic solvent is at least one solvent selected from the group consisting of propylene carbonate (PC), ethylene carbonate (EC), dimethyl carbonate (DMC), methylethyl carbonate (MEC), diethyl carbonate (DEC) and vinylene carbonate (VC).

17. The method of according to claim 16, wherein the terpolymer precursor is crosslinked by curing.

18. The method according to claim 17, wherein a plasticizer is added before curing.

19. The method according to claim 18, wherein
the plasticizer is at least one plasticizer selected from the group consisting of propylene carbonate, ethylene carbonate, dimethyl carbonate, methylethyl carbonate, and
diethyl carbonate and the content of the plasticizer is 10 to 60 parts by weight based on 100 parts by weight of the terpolymer.

20. The method of according to claim 16, wherein the terpolymer precursor is crosslinked via a crosslinking agent.

21. The method according to claim 20, wherein a catalyst is added before crosslinking the terpolymer via the crosslinking agent.

22. The method according to claim 21, wherein
the catalyst is at least one catalyst selected from the group consisting of benzoylperoxide, azobis(isobutyronitrile) (AIBN) and dicumylperoxide, and
the content of the catalyst is 0.1 to 20 parts by weight based on 100 parts by weight of the terpolymer.

23. The method according to claim 20, wherein
the crosslinking agent is N,N-(1,4-phenylene) bismaleimide, and
the content of the crosslinking agent is 0.1 to 50 parts by weight based on 100 parts by weight of the terpolymer.

24. The method according to claim 16, wherein sandwiching is accomplished by
inserting the separator, the cathode and the anode into a case, and
injecting the composition for forming an electrolyte into the case.

25. The method according to claim 16, wherein sandwiching is accomplished by coating the composition for forming an electrolyte, on at least one of the cathode, the anode and the separator and then drying.

26. The method according to claim 16, wherein the temperature of the terpolymer precursor during crosslinking is in the range of 50° C. to 200° C.

27. The method according to claim 16, wherein the terpolymer precursor contains
0.1 to 0.9 mol of the repeating unit represented by formula 1,
0.1 to 0.8 mol of the repeating unit represented by formula 2, and
0.01 to 0.8 mol of the repeating unit represented by formula 3.

28. The method according to claim 16, wherein
the weight-average molecular weight of the terpolymer is 10$^3$ to 10$^7$, and
the glass transition temperature is −80° C. to 100° C.

29. The method according to claim 16, wherein the ratio of the weight of the terpolymer to the total weight of the lithium salt and the organic solvent is in the range from 1:1 to 1:50.

30. The method according to claim 16, wherein
the method further comprises winding at least the separator, the cathode and the anode to form a winding type electrode assembly, and
the winding type electrode assembly is contained within a pouch case.

31. The method according to claim 16, wherein
the separator is formed of an insulating resin sheet, and
the insulating resin sheet is made of at least one material selected from the group consisting of polyethylene and polypropylene.

32. A polymeric gel electrolyte comprising:
a lithium salt;
an organic solvent; and
a cross-linked polymerizing product of a crosslinking agent and a terpolymer precursor having a repeating unit represented by formula 1, a repeating unit represented by formula 2 and a repeating unit represented by formula 3:

—(CH$_2$CH$_2$O)—      Formula 1

—(CH$_2$CHO)—      Formula 2
    |
   CH$_2$
    |
  O(CH$_2$CH$_2$O)$_n$R

—(CH$_2$CHO)—      Formula 3
    |
  CH$_2$OCH$_2$CH=CH$_2$ wherein n is an integer from 1 to 12, and R is a C$_1$ to C$_{12}$ alkyl group, and
wherein:
the lithium salt is at least one salt selected from the group consisting of lithium perchlorate (LiClO$_4$), lithium tetrafluoroborate (LiBF$_4$, lithium hexafluorophosphate (LiPF$_8$), lithium trifluoromethanesulfonate (LiCF$_3$SO$_3$) and lithium bistrifluoromethanesulfonyl amide (LiN(CF$_3$SO$_2$)$_2$), and the organic solvent is at least one solvent selected from the group consisting of propylene carbonate (PC), ethylene carbonate (EC), dimethyl carbonate (DMC), methylethyl carbonate (MEC), diethyl carbonate (DEC) and vinylene carbonate (VC).

33. The polymeric gel electrolyte according to claim 32, wherein a catalyst is further included in the crosslinking polymerization reaction between the terpolymer and the crosslinking agent.

34. The polymeric gel electrolyte according to claim 33, wherein the catalyst is at least one catalyst selected from the group consisting of benzoylperoxide, azobis (isobutyronitrile) (AIBN) and dicumylperoxide, and the content of the catalyst is 0.1 to 20 parts by weight based on 100% by weight of the terpolymer.

35. The polymeric gel electrolyte according to claim 32, wherein the crosslinking agent is N,N-(1,4-phenylene) bismaleimide, and the content thereof is 0.1 to 50 parts by weight based on 100 parts by weight of the terpolymer.

36. The polymeric gel electrolyte according to claim 32, wherein the temperature of the polymerization between the terpolymer and the crosslinking agent is in a range of 50 to 200° C.

37. A lithium battery comprising:

an electrode assembly having a cathode, an anode and a separator interposed therebetween;

a polymeric gel electrolyte comprising a lithium salt, an organic solvent and a polymerizing product of a crosslinking agent and a terpolymer precursor having a repeating unit represented by formula 1, a repeating unit represented by formula 2 and a repeating unit represented by formula 3:

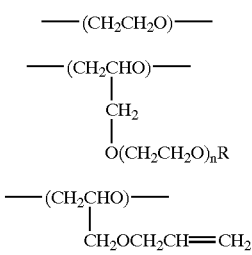

Formula 1
—(CH$_2$CH$_2$O)—

Formula 2
—(CH$_2$CHO)—
   |
   CH$_2$
   |
   O(CH$_2$CH$_2$O)$_n$R

Formula 3
—(CH$_2$CHO)—
   |
   CH$_2$OCH$_2$CH═CH$_2$ wherein n is an integer from 1 to 12, and R is a C$_1$ to C$_{12}$ alkyl group; and a case accommodating the electrode assembly and the polymeric gel electrolyte, and wherein the lithium salt is at least one salt selected from the group consisting of lithium perchlorate (LiClO$_4$ lithium tetrafluoroborate (LiBF$_4$), lithium hexafluorophosphate (LiPF$_6$), lithium trifluoromethanesulfonate (LiCF$_3$SO$_3$) and lithium bistrifluoromethanesulfonyl amide (LiN(CF$_3$SO$_2$)$_2$), and the organic solvent is at least one solvent selected from the group consisting of propylene carbonate (PC), ethylene carbonate (EC), dimethyl carbonate (DMC), methylethyl carbonate (MEC), diethyl carbonate (DEC) and vinylene carbonate (VC).

38. The lithium battery according to claim 37, wherein the terpolymer precursor contains 0.1 to 0.9 mol of the repeating unit represented by formula 1, 0.1 to 0.8 mol of the repeating unit represented by formula 2, and 0.01 to 0.8 mol of the repeating unit represented by formula 3.

39. The lithium battery according to claim 37, wherein the separator is formed of an insulating resin sheet, and the insulating resin sheet is made of at least one material selected from the group consisting of polyethylene and polypropylene.

40. The lithium battery according to claim 37, wherein the weight-average molecular weight of the terpolymer is 10$^3$ to 10$^7$, and glass transition temperature is −80° C. to 100° C.

41. The lithium battery according to claim 37, wherein the ratio of the weight of the terpolymer to the total weight of the lithium salt and the organic solvent is in the range from 1:1 to 1:50.

42. The lithium battery according to claim 37, wherein the electrode assembly is a winding type electrode assembly, and the case accommodating the electrode assembly is a pouch.

43. The lithium battery according to claim 37, wherein a catalyst is further included in the crosslinking polymerization reaction between the terpolymer and the crosslinking agent.

44. The lithium battery according to claim 43, wherein the catalyst is at least one selected from the group consisting of benzoylperoxide, azobis (isobutyronitrile) (AIBN) and dicumylperoxide and the content of the catalyst is 0.1 to 20 parts by weight based on 100 parts by weight of the terpolymer.

45. The lithium battery according to claim 37, wherein the crosslinking agent is N,N-(1,4-phenylene)bismaleimide and the content thereof is 0.1 to 50 parts by weight based on 100 parts by weight of the terpolymer.

46. The lithium battery according to claim 37, wherein the electrolyte is prepared by mixing the terpolymer having the repeating unit represented by formula (1), the repeating unit represented by formula (2), and the repeating unit represented by formula (3) with a lithium salt, an organic solvent, a catalyst and a crosslinking agent, injecting the resultant into a case accommodating the electrode assembly, and polymerizing.

47. The lithium battery according to claim 37, wherein the electrolyte is prepared by coating a composition obtained by mixing the terpolymer having the repeating unit represented by formula (1), the repeating unit represented by formula (2), and the repeating unit represented by formula (3) with a lithium salt, an organic solvent, a catalyst and a crosslinking agent, on at least one of a cathode, an anode and a separator, drying the resultant and polymerizing.

48. The lithium battery according to claim 37, wherein the temperature of the polymerization between the terpolymer and the crosslinking agent is in the range of 50 to 200° C.

* * * * *